3,360,443
RECOVERY OF DIMETHYL FORMAMIDE FROM TRIACETYLENE BY DISTILLATION IN THE PRESENCE OF A POLYMERIZATION INHIBITOR
David Apotheker, Wilmington, Del., assignor to E. I. du Pont de Nemours and Company, Wilmington, Del., a corporation of Delaware
Filed Jan. 22, 1965, Ser. No. 427,248
4 Claims. (Cl. 203—9)

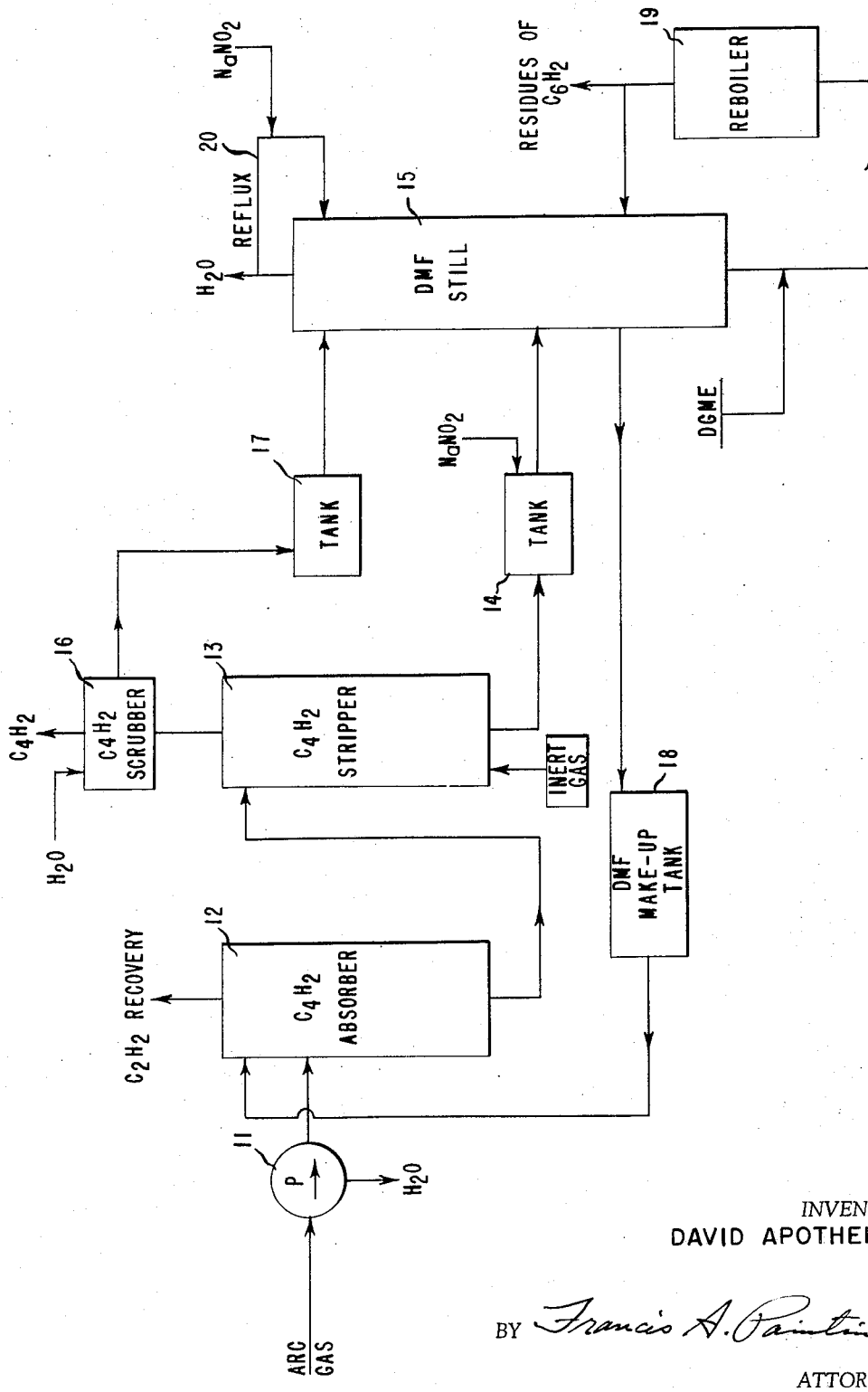

This invention relates to the inhibition of polymerization. More particularly, this invention relates to an improvement in the recovery of dimethylformamide used in the purification of acetylene produced by the arc process wherein undesirable polymer growth is inhibited.

When acetylene is produced from hydrocarbons by the electric arc process, the acetylene-containing gas stream contains diacetylene and various other by-products, typically composed as shown in Example 2 of U.S. Patent 3,147,312. The acetylene-containing gas stream is purified by a series of absorption and stripping operations using an appropriate solvent such as dimethylformamide, which is later recovered by conventional distillation; a typical process is illustrated in FIGURE 2 of U.S. Patent 3,147,312. In the above-mentioned typical composition of the acetylene-containing gas stream, a substantial amount of diacetylene is present which can polymerize to solid polymers capable of causing difficulty with the flow of materials through the lines and vessels used in the acetylene purification. Accordingly, as shown by FIGURE 2 of the reference patent, diacetylene is removed from the dimethylformamide solution by absorption and scrubbing and the dimethylformamide solution is returned to a still for recovery of the solvent.

Only recently has it been found that among the various by-products in the acetylene-containing gas stream, there is an appreciable amount of triacetylene, $C_6H_2$, identified by mass-spectographic analysis. Unfortunately, when triacetylene is present in the dimethylformamide solution which is to be recovered by distillation, it polymerizes readily under the severe conditions of time and temperature required to distill the dimethylformamide. The polymers of triacetylene concentrate and deposit in the distillation apparatus causing plugging and shutdowns. It has been found that an alkali metal nitrite such as sodium nitrite, prevents polymer formatiton in the still column which operates at about 150° C. under atmospheric pressure. However, when the "bottoms" from the still are heated at about 165 C.° in a reboiler to recover additional dimethylformamide, the higher acetylenic polymers rapidly form and concentrate there, causing plugging and shutdown.

It has unexpectedly been found that undesirable polymer growth can be inhibited during the distillation of dimethylformamide containing triacetylene even at temperatures such as 165° C. by adding an alkali metal nitrite and either ethylene glycol or a diethylene glycol monoalkyl ether to the solution. The amount of alkali metal nitrite should be from about 0.002 to 0.5 weight percent and the amount of glycol or ether should be from 0.05 to 0.5 weight percent; both percentages are based on the weight of dimethylformamide. The monoalkyl ether of diethylene glycol should contain from about 1 to 4 carbon atoms in the alkyl group attached through oxygen to the diethylene glycol radical.

The invention will now be described with reference to the accompanying drawing which illustrates a specific process embodiment thereof where dimethylformamide is used in the separation of acetylene, and subsequently recovered. A gas stream from an electric air furnace containing acetylene, diacetylene, triacetylene, water, and hydrogen along with higher acetylenic compounds is compressed in pump 11 to remove most of the water vapor, and fed to the diacetylene absorption tower 12 at 30° C. countercurrent to a stream of dimethylformamide. The unabsorbed gas consisting mainly of acetylene is passed into the acetylene recovery process. The dimethylformamide stream from the bottom of absorption tower 11 contains diacetylene and higher acetylenic compounds including triacetylene. This stream is passed to stripper 13 where it is stripped with inert gas (mostly hydrogen) from the electric arc, and the relatively concentrated dimethylformamide solution containing higher acetylenic compounds including triacetylene is sent to storage tank 14 to feed the still column 15. The gas from stripper 13 is scrubbed in scrubber 16 with water or aqueous solutions from the process to recover dimethylformamide. Diacetylene remains with the gas stream for disposal. The relatively dilute dimethylformamide solution containing less than 0.5 weight percent triacetylene and other acetylenic compounds is sent to storage tank 17 to feed the still column 15. A 10 weight percent solution of sodium nitrite in a 50/50 mixture of water and dimethylformamide is continuously added in equal amounts to tank 14 and to reflux line of still 15. The total amount of sodium nitrite added is sufficient to maintain a weight ratio in still column 15 of acetylenic compound to sodium nitrite of about 10:1. Still column 15 operates at a temperature of about 150° C. to remove the water introduced in the process. The dimethylformamide, recovered by distillation, is returned to a makeup tank 18 for reuse. A reboiler 19 attached to the still column 15 operates at a temperature of about 165° C. to remove residual dimethylformamide from the bottoms containing polymers of higher acetylenic compounds including triacetylene and other solids which accumulate during operation. During operation a 20 weight percent solution of diethylene glycol monobutyl ether (DGME) in dimethylformamide (DMF) is continuously added to the feed line from still 15 to reboiler 19. The concentration of DGME is maintained at about 0.08 weight percent based on the DMF content of the solution feeding still 15 from tank 14.

Typical results show that the still column 15 operates for 2700 hours and the reboiler 19 for 700 hours before a cleanup is needed to avoid pluggage. However, when the process is operated without the use of sodium nitrite and diethylene glycol monobutyl ether, the still column and the reboiler typically plug up after 100 hours and 30 hours of operation, respectively.

In operating the process of the invention it is essential that both the alkali metal nitrite and the glycol or ether be added between scrubber 16 and still 15 and between stripper 13 and still 15 of the illustrated recovery process. It is known to add an alkali metal nitrite before the stripper 13 of the illustrated process to prevent polymerization of diacetylene during the stripping operation. If an alkali metal nitrite is added between the scrubber 16 and still 15 and between the stripper 13 and the still 15, a reduction in the rate of formation of triacetylene polymers is found. However, when the still bottoms are reworked in the reboiler 19, polymerization occurs with rapid pluggage of the line. Thus, an alkali metal nitrite alone is not an adequate preventive for the formation of triacetylene polymers under the temperature and time conditions existing in the reboiler 19.

When an alkali metal nitrite is used in combination with the glycol or ethers described, the reboiler 19 can be operated for greatly extended periods without plugging and thus the dimethylformamide is more efficiently recovered.

Alkali metal nitrites suitable for use in the process are those of sodium, potassium and lithium. Sodium nitrite is preferred. It is convenient to base the concentration of nitrite on the weight of dimethylformamide to be purified. Weight concentrations in the range of 0.002 to 0.5% based on the dimethylformamide may be used. Preferred concentrations are in the range of 0.005 to 0.3 weight percent. It is convenient to add the alkali metal nitrite continuously as a 10% aqueous solution at the column reflux 20 and and feed tank 14 in the illustrated process, but it may be added anywhere between the scrubber 16 and still 15 and between the stripper 13 and the still 15.

The monoalkyl ethers of diethylene glycol of particular value for use in the process are those containing from 1 to 4 carbon atoms in the alkyl group attached through oxygen to the diethylene glycol radical. The monobutyl ether of diethylene glycol is preferred. Ethylene glycol itself is also useful and can be used by substituting equal amounts thereof for the DGME used in the specific embodiments described herein. The monoalkyl ether of diethylene glycol may be mixed with the sodium nitrite solution and the two materials added simultaneously or it may be preferably added between still 15 and reboiler 19. In this case it is convenient to add the ether as a 20% solution in dimethylformamide to avoid aqueous dilution of the contents of the reboiler 19.

The improvement realized by this invention is also illustrated in and by the following specific example wherein parts and percentages are by weight unless otherwise specified.

*Example*

Acetylene and by-products including hydrogen, diacetylene, other acetylenic compounds including triacetylene, along with quench water, obtained from an electric arc furnace reactor are absorbed in dimethylformamide. Acetylene, diacetylene and hydrogen are removed. The dimethylformamide solution contains about 0.075% of triacetylene. The solution is treated at room temperature with 0.2 part of sodium nitrite added as a 10% aqueous solution. The solution mixture is heated to reflux (about 145° C.) at atmospheric pressure, and held there for one hour. No insoluble polymer formation is observed. The solution mixture is concentrated by evaporation at the boiling point (about 150° C.) to about 1/10 of its previous volume. To this concentrate is added 0.2 part of the monobutyl ether of diethylene glycol. The concentrate is boiled for about 20 minutes through a glass tube which is externally heated. Only a trace of a polymeric deposit is observed on the glass tube.

If the procedure is repeated, but no monobutyl ether of diethylene glycol is used, a heavy polymeric deposit is observed on the glass tube.

An attempt to repeat the procedure in the absence of sodium nitrite and monobutyl ether of diethylene glycol is unsuccessful. A copious polymeric precipitate is observed after heating the dimethylformamide solution under reflux for one hour. When the refluxed solution is diluted with water to about 50% dimethylformamide content, additional polymeric precipitation is observed. The experiment is stopped at this point.

When the procedure of the example is repeated using 0.1 part of sodium nitrite and 0.5 part of the monobutyl ether of diethylene glycol, similar results are obtained.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. In the process which comprises (1) the purification of acetylene, which is made by the pyrolysis of hydrocarbons, by absorbing diacetylene and higher acetylenic compounds including triacetylene with a dimethylformamide solution, (2) substantially removing the diacetylene therefrom, and (3) recovering the dimethylformamide by distillation; the improvement, in said recovery, of adding to the dimethylformamide solution containing said higher acetylenic compounds (a) from 0.002 to 0.5 weight percent alkali metal nitrite and (b) from 0.05 to 0.5 weight percent of a second component selected from the group consisting of ethylene glycol and a monoalkyl ether of diethylene glycol having from 1 to 4 carbon atoms in the alkyl group, both percentages based on the weight of dimethylformamide, said addition being subsequent to step (2) but before step (3).

2. A process improvement as defined in claim 1 wherein said alkali metal is sodium nitrite.

3. A process improvement as defined in claim 1 wherein said second component is diethylene glycol monobutyl ether.

4. A process improvement as defined in claim 1 wherein said alkali metal nitrite is sodium nitrite present in amounts ranging from 0.005 to 0.3 weight percent, and wherein said second component is diethylene glycol monobutyl ether.

References Cited

UNITED STATES PATENTS

| | | | |
|---|---|---|---|
| 2,715,103 | 8/1955 | Nelson | 252—1 |
| 2,900,421 | 8/1959 | Kharasch | 230—9 |
| 2,915,138 | 12/1959 | Sarabia | 55—64 |
| 2,971,608 | 2/1961 | Sarabia | 55—64 |
| 3,147,312 | 1/1961 | Johnson | 260—678 |

WILBUR L. BASCOMB, JR., *Primary Examiner.*